Patented June 5, 1951

2,555,356

UNITED STATES PATENT OFFICE 2,555,356

METHOD FOR THE PREPARATION OF INULIN

John F. Marchand, New York, N. Y.

No Drawing. Application August 16, 1947, Serial No. 769,073

8 Claims. (Cl. 127—34)

This invention relates to a method for the preparation of inulin and, more particularly, to a method of preparing inulin from the tubers of the Jerusalem artichoke (*Helianthus tuberosus*) and similar plants.

Inulin $(C_6H_{10}O_5)_n$ (alantin, menyanthin, dahlin, synanthrin, sinistrin) occurs as a starchlike carbohydrate in the roots of certain plants, chiefly members of the family Compositae. The starches are glucose-fructose polymers. The inulins are polymers of fructose and differ from starch in solubility. Also inulins, as distinguished from starches, do not turn blue with iodine. Inulin is isolated as a white amorphous hygroscopic powder having a specific gravity of 1.35. It is very slightly soluble in cold water and very soluble in hot water. It decomposes to caramel when heated to 178° C. or when boiled with alkali. Furthermore, it hydrolyzes to levulose when warmed with dilute acids. Inulins have an optical rotation in the range of —38°. The use of the term "inulins" refers to apparent variations in the average lengths of the hexose chains as reflected in small differences in solubility of optical rotation of samples from various sources. Repeated recrystallizations do not yield samples exhibiting a uniform optical rotation.

Inulin has been used extensively for food only in the crude form, as a constituent of such roots as elecampane, dahlia, burdock, dandelion, chicory, and the Jerusalem artichoke. Of these, the two latter are abundant and cheap sources of carbohydrate (up to about 20 of the wet weight). The total carbohydrate content, and the ratio of inulin to other carbohydrates (mainly hexose sugars) varies with the season, the conditions of storage, and the richness of the soil in which grown. My experiments have shown that in artichoke tubers at 25° C., there is a rapid conversion of inulin to reducing sugar caused apparently by the enzyme inulinase present in the plant.

The inulin bearing tubers have long been of interest as potential sources of carbohydrates for the manufacture of foods or industrial alcohols. Agricultural experiment stations have shown that chicory and artichokes, in particular, can be grown even more abundantly and cheaply than potatoes and yield between one and two tons of inulin and hexose per acre. However, the difficulty and expense involved in attempts at separation of the polysaccharide components from the remaining constituents of the plant has prevented any profitable commercial exploitation of these roots for the production of inulin or its derivatives. Small batches of inulin have been prepared at considerable expense, for research and development purposes, and for the preparation of levulose in a pure form. Refined samples have been of fundamental importance in medicine for the study of kidney physiology.

Inulin was discovered and isolated by Tanret in Germany in the latter part of the 19th century. The methods of preparation employed since that time have been modifications of his procedure. Examples of heretofore used methods are given as follows:

In the process of obtaining inulin, according to J. J. Willamin (Journal of Biol. Chem. 51, 1922, 275–283), washed artichoke tubers are placed in boiling water (1,300 cc. of water per kilogram of tubers). 30 gm. of $CaCO_3$ are then added to this mixture and boiled for 15 or 20 minutes. The juice is removed from the artichokes with a press. The dry residue is boiled with a mixture of 1,000 cc. of water and 10 gm. of $CaCO_3$ and again pressed. The extracts are then combined. Lead acetate is added avoiding excess. The whole mixture is then centrifuged or filtered. The lead acetate is then removed from the supernatent liquid with ammonium oxalate and the liquid is centrifuged. The clear mother-liquor may then be treated with decolorizing carbon, evaporated in vacuo to 40–60% solids, and cooled to —5° C. for several hours. It is then stirred out in an equal volume of ice water and centrifuged. The liquor is mixed with three volumes of water and filtered while hot. The resultant filtrate is evaporated down to twice the original volume of the crystals and allowed to crystallize in the cold as before. Water is added and stirred and the mixture is filtered with the aid of suction, keeping everything cold. The resultant crystals are washed with cold water, then with 20, 50, 80, and 95% alcohol and finally with ether. The resultant cake is dried in an oven at 100° C. This gives a product with a specific rotation of —33°, which may increase to —38° after a third recrystallization.

According to the method disclosed by G. Belanescu and A. Popescu (Soc. Chim. Rom. 3:A151-8, 1941–2), 100 gms. of the dry tubers, ground to a flour, are boiled with 500 cc. of water and 3 gms. of $CaCO_3$ for one hour, and then filtered and pressed out as dry as possible. The residue is again boiled with 500 cc. of water and 1 gm. of $CaCO_3$. The mixed extracts are treated with basic lead acetate to remove protein and deleaded with $(COONH_4)_2$. The filtrate is then concentrated, decolorized with animal charcoal, evaporated to 100 cc., and cooled to 0° C. The solution is stirred vigorously with a glass rod until fine crystals begin to form. Acetone is then gradually added with constant stirring until no more precipitate is obtained. The precipitate is removed and the mother-liquor is concentrated and a second crop of crystals precipitated from it. The two batches of inulin are mixed and purified by washing with acetone. The yield is 20 to 21% of the dry weight of the tubers.

In the method of D. T. Englis and L. F. Sarlong (Trans. Illinois State Acad., Sci. 37, No. 1, 1943, 122-3), artichoke, chicory, and dahlia tubers were ground and extracted with hot water. After cooling, the protein in the extract was precipitated out with lead subacetate, $Pb(OAc)_2$, and the excess lead removed by disodium phosphate, $Na_2HPO_4$. The remaining solution was hydrolyzed with dilute acid and analyzed for sugar. No attempt was made to separate out the inulin from the solution. (The purpose of this procedure was to prepare a sweep syrup.)

Several practical difficulties have prevented the successful application of the above and similar methods to the isolation of polysaccharides from the inulin-bearing tubers, such as the artichoke. Such steps as drying the tubers (if done in a warm place) or heating the juice or watery extract allows more or less enzymatic conversion of inulin to levulose. (Levulose is virtually impossible to crystallize out.) Boiling the juice of the artichoke, whether acid, alkaline, or neutral, causes the precipitation of custard-like masses of albuminoid or saponin-like substances which foam up and spill over. A clean and effective separation of inulin from this muddy coagulum and from the remaining highly pigmented and malodorous juice is tedious or impossible by flotation, filtration, or centrifugation at various temperatures or pH values, and by the time the attempt is completed, the inulin has usually been lost by hydrolysis. The addition of a lead salt to clarify the juice is out of the question, because there can never be any certainty that the subsequent removal of excess lead is complete. Traces of lead in food or medicinal materials act as a cumulative poison. Because of the instability of inulin in hot acid or alkaline solutions, an attempt is made to buffer the juice by adding $CaCO_3$ powder in the above methods. I did not find this rather insoluble buffer a very effective protection against hydrolysis at high temperatures.

The repeated filtrations of inulin from aqueous solutions are impractical from the point of view of efficiency because the crystals are so fine and coherent that they tend to clog or run through any filter paper or cloth, or filter with infinite slowness.

The removal of proteins by chemical precipitation or heat coagulation is tedious in the case of the artichoke juice. The remaining inulin is still in a very impure solution not yet separated from other carbohydrates and some of the malodorous and pigmented constituents of the juice, not to mention the mineral elements. I found the addition of bone-black, "Norit," or activated carbon, in various forms, as ineffective as kaolin and other colloids for the purpose of decolorizing or deodorizing such samples. The addition of alcohol or acetone to such solutions precipitated out not only the inulin, but also most of the impurities. Repeated recrystallizations from water were necessary to produce a nearly colorless and odorless inulin, thus making the above procedure cumbersome and inefficient.

In view of the foregoing, therefore, it is an object of my invention to provide a relatively simple economic process for obtaining inulin from the tuberous roots of the Jerusalem artichoke and similar plants.

Another object of this invention is to provide a batch or continuous method for obtaining and isolating inulin from tuberous roots by relatively simple physical chemical means.

Still another object of this invention is to obtain a pure form of inulin for food or medicinal use, by a series of rapid or automatic easily operable steps.

An additional and more specific object of this invention is to provide a method for inexpensively preparing inulin by utilizing a series of easily operable steps.

With the above and other objects and features in view, a preferred method exemplifying my invention of a procedure for isolating a pure inulin is hereinafter given, a method based on the difference in the solubility curve of inulin from those of the other constituents of the tuber. Because of its well known variation in aqueous solubility with temperature, I have found a simple way to separate the inulin from the plant, wash it, and purify it.

Freshly picked artichoke tubers are washed, ground, and pressed at a temperature between 20 and 25° C. The brown, syrupy juice pressed from the grinds is passed at once through a centrifugal clarifier. (A stock model DeLaval industrial clarifier is suitable for this purpose.) This step removes sand, soil, and plant fiber. The clarified juice, which is usually in the range of pH 6, is chilled at once and stored for 24 hours or more at about 0° C. to inhibit the effect of enzyme action and to effect crystallization. The juice need not be frozen.

Inulin is virtually insoluble at about 0° C. During the interval of storage it appears in the juice in the form of very finely dispersed white crystals which cannot be readily separated by filtration, and only incompletely by decantation, from the thick brown juice. The suspension of crystalline inulin is readily identified by the iridescent sheen which it exhibits when the solution is agitated.

On completion of the crystallization step above, the juice is stirred with an equal volume of ice water at about 0° C. and directed into a centrifugal separator or clarifier and again centrifuged. A stock model (DeLaval Nozzlematic), continuously flowing centrifuge of the type used for concentrating fresh yeast permits continuous operation. The slurry or paste of inulin which has been separated from the bulk of the juice is resuspended in twice the volume of water at about 0° C. and recentrifuged one or more times, depending on the degree of purity required, and adjusted to pH 7 with a few drops of NaOH, $Na_3PO_4$, or other suitable alkaline substance.

Following the removal of the inulin, the remaining juice may be combined with the wash waters, fermented, and distilled for the production of alcohols, or processed by known methods for the production of a hexose syrup.

After the paste or slurry of crystalline inulin has been washed, it is warmed gently to a temperature just sufficient to cause all the inulin to go into solution, around 80 or 90° C., and an equal volume of warm water is added if required to dissolve all the inulin. The hot, clear, practically colorless inulin syrup is then passed again through a centrifugal clarifier and freed of any remaining traces of material differing in solubility from inulin itself. The clear hot inulin syrup may then be poured into sterile containers, in which it cools to form a white paste which must be protected against contamination by yeasts and molds.

If the inulin is desired in the form of a dry powder, the syrup is discharged into 5 volumes of acetone with thorough mixing. The white powdery precipitate of dehydrated inulin which forms is readily separated by decantation or rapid filtration, followed by moderately low temperature drying in air for removal of the last traces of acetone. It will be noted that alcohol may be used instead of acetone for this step with results almost as good. The organic solvent employed for the drying step is about 98% recoverable by well known adsorption and distillation procedures.

The yield depends on the concentration of inulin in the original tuber, and the completeness with which the juice is expressed from the fibrous pulp. With proper control of the specified temperatures, the recovery of inulin from this juice is nearly complete, because of the very low solubility of inulin in water at or near 0° C.

On test runs of the above described process, it was found that 20 lb. lots of artichokes gave 2½ to 3 gallons of clear pressed juice from which 2½ to 3 lbs. of thick, white wet inulin paste were obtainable, equivalent to dry weights of inulin upward from 1 or 2% of the fresh tubers.

From the foregoing description of my invention, it will be noted that I have provided a simple and economic method for isolating pure inulin using a minimum of chemical reagents and water. In my method, the acetone or other dehydrating medium may be omitted if the product does not have to be dry. The method dispenses entirely with such cumbersome procedures as preliminary separation from a protein coagulum, boiling, evaporations to smaller volumes, attempted filtrations of finely divided inulin from aqueous solutions, decolorization with carbon, separation of syrups from bone-black, recrystallizations, and the elaborate drying procedures involved in the processes used heretofore.

The inulin prepared by this method is of a purity fully suitable for food or medicinal uses. Because of its lack of toxicity, it may be used intravenously for kidney function studies, or intramuscularly as a vehicle for the administration of suspensions of hormones or other medicinal agents. As a food, it may be used as a starch substitute, or as a source material for the preparation of levulose or alcohol by methods which are already well known. It is free of contamination with lead compounds or other toxic materials heretofore employed in other methods for the preliminary step of coagulating and removing the proteins. Furthermore, the avoidance of temperatures as high as 100° C., as heretofore used either for processing or for drying, avoids both pyrogen formation and inulin losses by hydrolysis while economizing at the same time on the amount of heat required for carrying out the process. Such heat as is needed for steam or other purposes in the plant is obtainable by combustion of the cellulose residues of the tuber roots, or of the by-product alcohol obtained by fermentation of the residual juice.

While a preferred process of my invention has been disclosed herein, it is to be understood that certain changes as to steps, procedure, and use of materials may be made without departing from the spirit and scope of my invention.

I claim:

1. The process of preparing inulin, which comprises pressing a tuber root at about 25° C., clarifying the resultant juice extracted therefrom by centrifuging at 20 to 25° C., rendering said juice inert for a period of time by storing at zero temperature, adding an equal volume of cold water at about 0° C to said juice and centrifuging, removing the resultant paste or slurry and mixing same with about twice the volume of ice cold water at 0° C., recentrifuging, and neutralizing the mixture, then warming with an equal volume of water, and finally collecting the resultant syrup and cooling.

2. The process of preparing inulin, which comprises pressing a tuber root at a temperature between 20–25° C., clarifying the resultant juice, by centrifuging at 20 to 25° C. rendering said juice inert for a period of about 24 hours at about 0° C., adding an amount of water equal to the volume of the resultant slurry, cooling to about 0° C., centrifuging said resultant mixture, continuously removing the resultant paste or slurry, then mixing said paste with about twice its volume of cold water, recentrifuging, neutralizing the paste with a basic solution, heating the resultant centrifuged deposit to a temperature between 80–90° C. to effect solution of the resultant crystals, then centrifuging, and collecting the resultant white paste.

3. The process of preparing inulin from tuber roots, which consists in washing, grinding and pressing said roots to remove the liquid portion therefrom, centrifuging the liquid portion to clarify the same and remove the sediment therefrom, cooling the supernatant liquid at about 0° C. for about 24 hours, to form a crystalline deposit diluting said liquid with an equal amount of ice water at 0° C., centrifuging to obtain a slurry of inulin therefrom, resuspending the slurry in ice water, then recentrifuging a number of times to remove inert particles from the original juice, adjusting the pH value of the resultant slurry to 7.00, warming the slurry to between 80–90° C. adding an equal volume of water, centrifuging, and finally removing the resultant inulin concentrate.

4. In the process of preparing inulin, the steps comprising pressing cleaned, freshly picked tuber roots, centrifuging the resultant juice pressed therefrom, then chilling to about 0° C. and rendering said juice inert for a period of about 24 hours to prevent enzyme action in said juice, adding an equal amount of ice water to the juice, centrifuging said resultant mixture, removing the paste or slurry formed by said previous action, then mixing said paste with about twice its volume of water at about 0° C., recentrifuging, heating the paste with a neutralizing solution to about 90° C., then again centrifuging until a white inulin paste is formed.

5. The process of preparing inulin from tuber roots, of the Jerusalem artichoke group, comprising pressing freshly selected prewashed roots to remove the juices therefrom, at a temperature of about 20 to 25° C., centrifuging the liquid portion to separate soil, fibers and other foreign matter, removing said sediment therefrom and freezing the supernatent liquid at about 0° C. for about 24 hours to permit the formation of crystals in the liquid, diluting said liquid with an equal amount of ice water at about 0° C., centrifuging said mixture, removing the resultant paste or slurry therefrom, mixing the paste or slurry with about twice its volume of ice water at 0° C., then recentrifuging to remove further formed inert particles from the original juice, bringing the resultant slurry to a value of pH 7.00 with an alkaline substance, warming the slurry mixture to about 100° C. to effect solution of the inulin crystals, adding an equal volume of water, warming the solution, recentrifuging, and finally removing the resultant inulin concentrate.

6. The method of obtaining inulin from tuber roots of the artichoke family, comprising pressing freshly picked tubers to obtain a juice, filtering and centrifuging the resulting juice at ordinary temperatures to remove sand, soil and plant fiber therefrom, storing the clarified juice for twenty four hours at about 0° C. sufficient to permit crystallization of inulin contained in the juice, adding an equal volume of ice water to the juice to increase separation of inulin in the juice, separating the inulin from the liquid and then adding twice its volume of ice water at 0° C. to the inulin, adjusting the pH value to 7.00, warming to 80–90° C. with an equal volume of water, clarifying the resultant mixture, and finally concentrating the inulin by washing in a water removing solvent, filtering off the solvent, then aerating the inulin to drive off any water removing solvent therefrom.

7. The process of preparing inulin, which consists in obtaining juice from tuber roots, centrifuging and cooling the resultant juice, letting the juice stand at a temperature of about 0° C. for a period of about 24 to 48 hours, separating the resultant solid particles of inulin at 0° C. from the mixture, mixing the solid particles with ice water in the ratio of two gallons of ice water to every lb. of precipitated solid particles, separating the particles again in water at about 0° C. and pouring same into hot water at about 90° C. at pH 7.00 to dissolve said particles, centrifugally clarifying the resultant mixture, then concentrating the resultant filtrate.

8. The process of obtaining powdered inulin from tubers of the Jerusalem artichoke type, which consists in centrifuging at 20 to 25° C., the resultant juice obtained from said tubers, discarding the sediment, chilling the juice at about 0° C. over a period of time sufficient to cause precipitation of inulin in the juice, separating the resultant precipitate from the liquid, concentrating and recooling the filtrate to about 0° C. and reprecipitating to obtain more inulin, adding both filtrates with constant stirring to ice water, separating the rest of the precipitate from this liquid, mixing the precipitates and removing the foreign material therefrom, dissolving the precipitate in hot water at a temperature between 80° and 100° C., and bringing the hydrogen ion concentration value of the resultant solution to pH 7.00, warming to about 80 to 90° C., centrifugally clarifying the solution and precipitating the purified inulin from the clarified solution, mixing with about 5 volumes of acetone to remove water therefrom, then filtering and drying the precipitate.

JOHN F. MARCHAND.

REFERENCES CITED

The following references are of record in the file of this patent:

UNITED STATES PATENTS

| Number | Name | Date |
| --- | --- | --- |
| 1,616,164 | Arsem | Feb. 1, 1927 |

OTHER REFERENCES

Willaman, J. Biol. Chem., vol. 51, 1922 pages 275–283.

Belanescu et al., Soc. Chim. Rom. 3, A151–8, 1941–2.

Circular C–440, page 398, "Polarimetry, Saccharimetry and the Sugars," The National Bureau of Standards, Washington, 1942.